(12) United States Patent
Bhagwat et al.

(10) Patent No.: US 8,242,762 B2
(45) Date of Patent: Aug. 14, 2012

(54) TRANSIENT RECOVERY CIRCUIT FOR SWITCHING DEVICES

(75) Inventors: Hrishikesh Bhagwat, Bangalore (IN); Rupak Ghayal, Bangalore (IN); Saumitra Singh, Bangalore (IN); Pawan Gupta, Gwalior (IN); Prakash Easwaran, Bangalore (IN)

(73) Assignee: Cosmic Circuits Private Limited, Bangalore (IN)

( * ) Notice: Subject to any disclaimer, the term of this patent is extended or adjusted under 35 U.S.C. 154(b) by 522 days.

(21) Appl. No.: 12/436,136

(22) Filed: May 6, 2009

(65) Prior Publication Data
US 2009/0278516 A1 Nov. 12, 2009

(30) Foreign Application Priority Data
May 12, 2008 (IN) .......................... 1242/CHE/2008

(51) Int. Cl.
*G05F 1/575* (2006.01)

(52) U.S. Cl. ............................ 323/282; 307/152; 700/46
(58) Field of Classification Search .......... 323/282–286; 307/152; 700/46
See application file for complete search history.

(56) References Cited

U.S. PATENT DOCUMENTS

| 6,696,882 B1 * | 2/2004 | Markowski et al. ........... 327/531 |
| 2007/0210777 A1 * | 9/2007 | Cervera et al. ................ 323/284 |

* cited by examiner

*Primary Examiner* — Harry Behm
(74) *Attorney, Agent, or Firm* — Evergreen Valley Law Group, P.C.; Kanika Radhakrishnan (57) ABSTRACT

A transient recovery circuit for switching devices. The transient recovery circuit includes a detecting circuit for detecting a rapid transient in an output voltage of a switching device by detecting a rate of the output voltage transient; an auxiliary controlling circuit in a feedback loop of the switching device for correcting the output voltage by changing a bandwidth of the feedback loop if the rapid transient is detected; and an initializing circuit for initializing the feedback loop to expected operating points in a continuous conduction mode after correcting the output voltage.

15 Claims, 8 Drawing Sheets

TRANSIENT RECOVERY CIRCUIT FOR SWITCHING DEVICES

BACKGROUND

This patent application claims priority from Indian Non provisional patent application number 1242/CHE/2008, filed on May 15, 2008 entitled "A TRANSIENT RECOVERY CIRCUIT FOR SWITCHING DEVICES" and assigned to Cosmic Circuits Private Limited., 303, A Block, AECS Layout, Kundalahalli, Bangalore-560037, India, which is hereby incorporated in its entirety.

FIELD

Embodiments of the invention relate generally to switching devices and more particularly to transient recovery circuits in switching devices.

PRIOR ART

Many of today's battery powered consumer products require more than one power supply voltage level to operate. For example, a Central Processing Unit (CPU) for a laptop may be designed to operate at 2.9 volts while the hard disk drive operates at 5 volts. Instead of providing several sources of power supply, these products typically use a single power supply source and generate other supply levels with DC to DC converters. The DC to DC conversion is typically performed by the power supply regulator circuitry that is universally provided in battery operated electronic products.

There are basically two types of power supply regulators, linear and switching regulators. Linear regulators rely on a linear control element with feedback to regulate a constant voltage. When a linear regulator is used as a DC to DC converter, there is an appreciable amount of power dissipation.

In a switching regulator, a transistor operating as a switch (switch transistor) periodically applies the input voltage across an inductor for short intervals. Since the input voltage is switched ON and OFF to transfer just enough charge to the load, an ideal switching regulator dissipates zero power. The duty cycle of the switching determines the output voltage level of the switching regulator. There are several types of switching regulators, for example, step-down, step-up, and inverting regulators. Although there are different ways to realize switching conversion, a common method uses inductor and capacitor as energy storage elements and a Metal Oxide Semiconductor Field Effect Transistor (MOSFET) as the switch transistor.

Transient response of a typical switching regulator depends on bandwidth and order of compensation of the system. In a switching regulator, transient response is a function of parameters including output capacitor, inductor, gain of the error amplifier, and compensation network. The output capacitor, inductor, and the operating frequency of the system are chosen based on ripple and efficiency requirements. Once these have been determined, a compensation network is designed based on bandwidth and DC as well as transient line or load regulation requirements.

The aforementioned design approach typically involves a trade-off between accuracy (higher order and gain), speed (higher bandwidth) and surface area required to implement the network on an integrated circuit. Further, in case of low load current to high load current transients and vice versa, a pulse width mode (PWM) switching regulator moves from discontinuous conduction mode (DCM) to continuous conduction mode (CCM). This causes a change in loop dynamics, and consequently the system consumes a large amount of time to settle to the new operating points.

The output voltage of a switching regulator drops if the load current requirement increases and rises if the load current requirement decreases. The ability to respond to a change in load current depends upon the speed of load transient and the bandwidth of the system. If the change in load current is slower than bandwidth of the system, a control loop (feedback loop) can correct the transient and output voltage will be at the expected value. For a fast change in load current, for example, zero to full load in few hundred nanoseconds, the loop response is limited by bandwidth of the feedback loop. Further, because of once per cycle correction of a switching regulator, the response average time is limited to D*T where D is duty cycle and T is time period. The output voltage continues to drop depending on load current and output capacitor till the feedback loop starts correcting. This time is of the order of Tau wherein Tau=1/2*pi*Loop Bandwidth.

Further, response time is degraded significantly if the system needs to transition from DCM to CCM. In typical second order systems, the effective fall in the output voltage can be approximately 20% of output value, before the feedback loop starts to correct. Further, the time to settle to within 2% of the desired output value is approximately 5*Tau. For example, in a 100 KHz bandwidth system, this time period will be approximately 50 μs. For a high load to low load transient, by similar analysis, the output rises by approximately 20% of output value, and takes 5 to 7 Taus to settle.

In light of the foregoing discussion, there is a need to provide an efficient and fast transient response mechanism in switching devices.

SUMMARY

Embodiments of the invention described herein provide systems and method for providing rapid transient recovery in switching devices.

An exemplary embodiment of the invention provides a transient recovery circuit for switching devices. The transient recovery circuit includes a detecting circuit for detecting a rapid transient in an output voltage of a switching device by detecting a rate of the output voltage transient; an auxiliary controlling circuit, in a feedback loop of the switching device, for correcting the output voltage by changing a bandwidth of the feedback loop if the rapid transient is detected; and an initializing circuit for initializing the feedback loop to expected operating points in a continuous conduction mode after correcting the output voltage.

An exemplary embodiment of the invention provides a method for responding to rapid transient in a switching device. A rapid transient in an output voltage of a switching device is detected by detecting a slope of the output voltage. If a rapid transient is detected, bandwidth of a feedback loop of the switching device is changed for correcting the output voltage. Further, the feedback loop is initialized to the expected operating points in a continuous conduction mode.

An exemplary embodiment of the invention provides a circuit for detecting rapid transients in switching devices. The circuit includes a first comparator with a first input terminal connected to a first reference voltage and a second input terminal connected to a feedback voltage of a switching device for determining whether the output voltage is exceeding the first reference voltage; a second comparator with a first input terminal connected to a second reference voltage and a second input terminal connected to the feedback voltage of the a switching device for determining whether the output voltage is exceeding the second reference voltage. The circuit further includes a state machine connected to outputs of the first comparator and the second comparator for detecting a rapid transient. Rapid transient is detected by determining a rate of output voltage transient if the output voltage is exceeding the first reference voltage and the second reference voltage in a predetermined time period.

Other aspects and example embodiments are provided in the Figures and the Detailed Description that follows.

DETAILED DESCRIPTION OF THE EMBODIMENTS

Embodiments of the invention described herein provide systems and method for fast and accurate transient recovery in switching devices. An embodiment of the invention provides a method to increase the bandwidth of the feedback loop of the switching regulator. Another embodiment of the invention provides a rapid transient detecting circuit to detect a rapid transient by monitoring an output voltage slope of the switching regulator.

Figure 1:
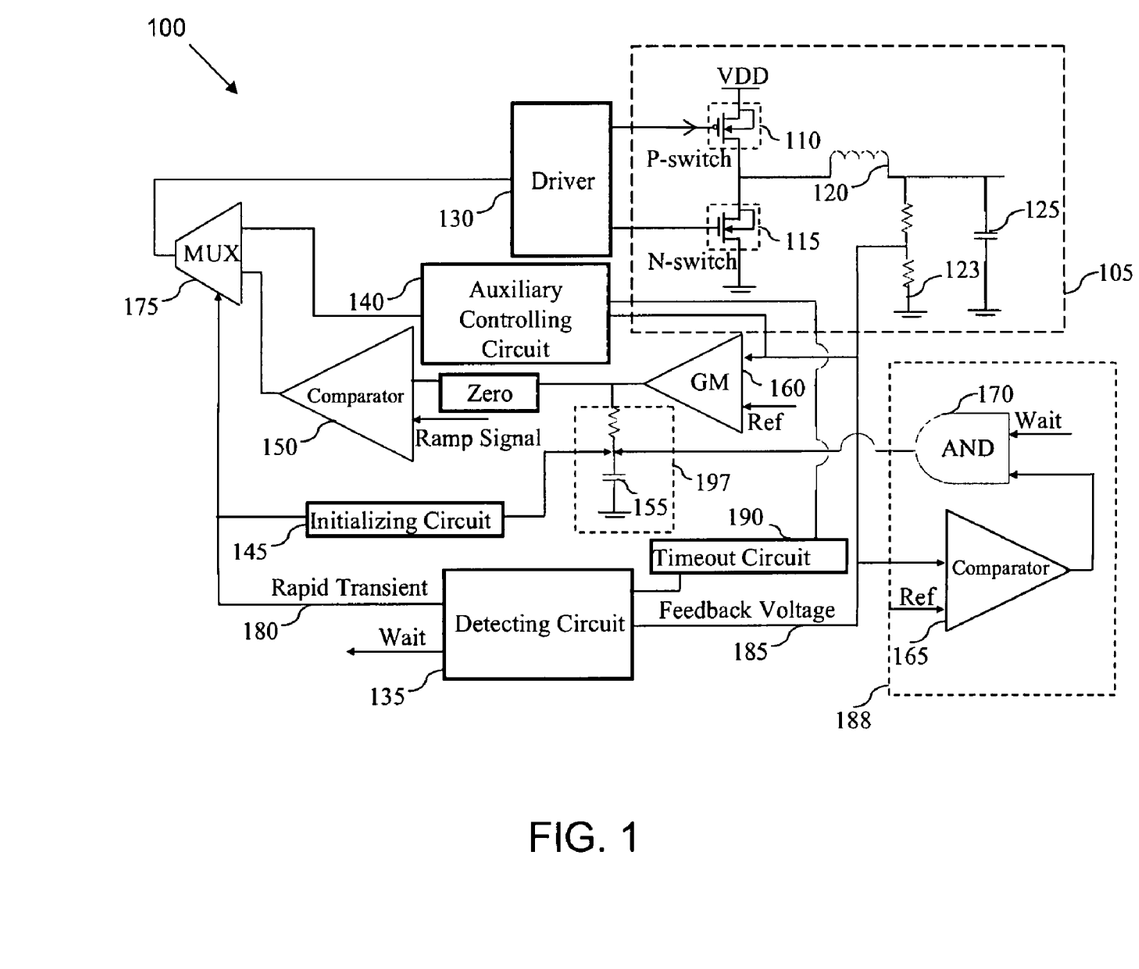
FIG. 1 illustrates a transient recovery circuit according to an embodiment of the invention.

FIG. 1 illustrates a transient recovery circuit 100 according to an embodiment of the invention. The switching device includes a switching regulator. Various embodiments of the invention are explained using a switching regulator as an example of a switching device. A switching stage 105 of a switching regulator includes two switching transistors 110 and 115 serially connected to each other through a drain of the switching transistor 110 and a source of the switching transistor 115. Gates of the switching transistors 110 and 115 are connected to a driver 130. The output of the switching stage 105 includes an inductor 120 and a parallel connection of a resistance divider 123 and an output capacitor 125.

Feedback voltage from the switching stage 105 is provided from an intermediate tap on the resistance divider 123 through a line 185 to an auxiliary controlling circuit 140, an error amplifier 160, a loop controlling circuit 188, and a detecting circuit 135. An exemplary implementation of the detecting circuit 135 is explained in FIG. 2. The detecting circuit 135 triggers the auxiliary controlling circuit 140 if a rapid transient is detected. An output of the detecting circuit 135 is connected to an initializing circuit 145 through a line 180. A timeout circuit 190 is connected between the detecting circuit 135 and the auxiliary controlling circuit 140.

Transient recovery circuit 100 further includes an the error amplifier 160 supplied with feedback voltage and a reference voltage. The output of the error amplifier 160 is connected to an RC filter 197 including a resistor and an error amplifier output capacitor 155. A comparator 150 receives the output of the error amplifier 160 and a ramp signal as inputs. An output of the initializing circuit 145 is connected to the junction of the RC filter 197. Outputs of the comparator 150, detecting circuit 135 and auxiliary controlling circuit 140 are connected to a multiplexer (MUX) 175 and an output of the multiplexer 175 is connected to the driver 130.

Figure 2:
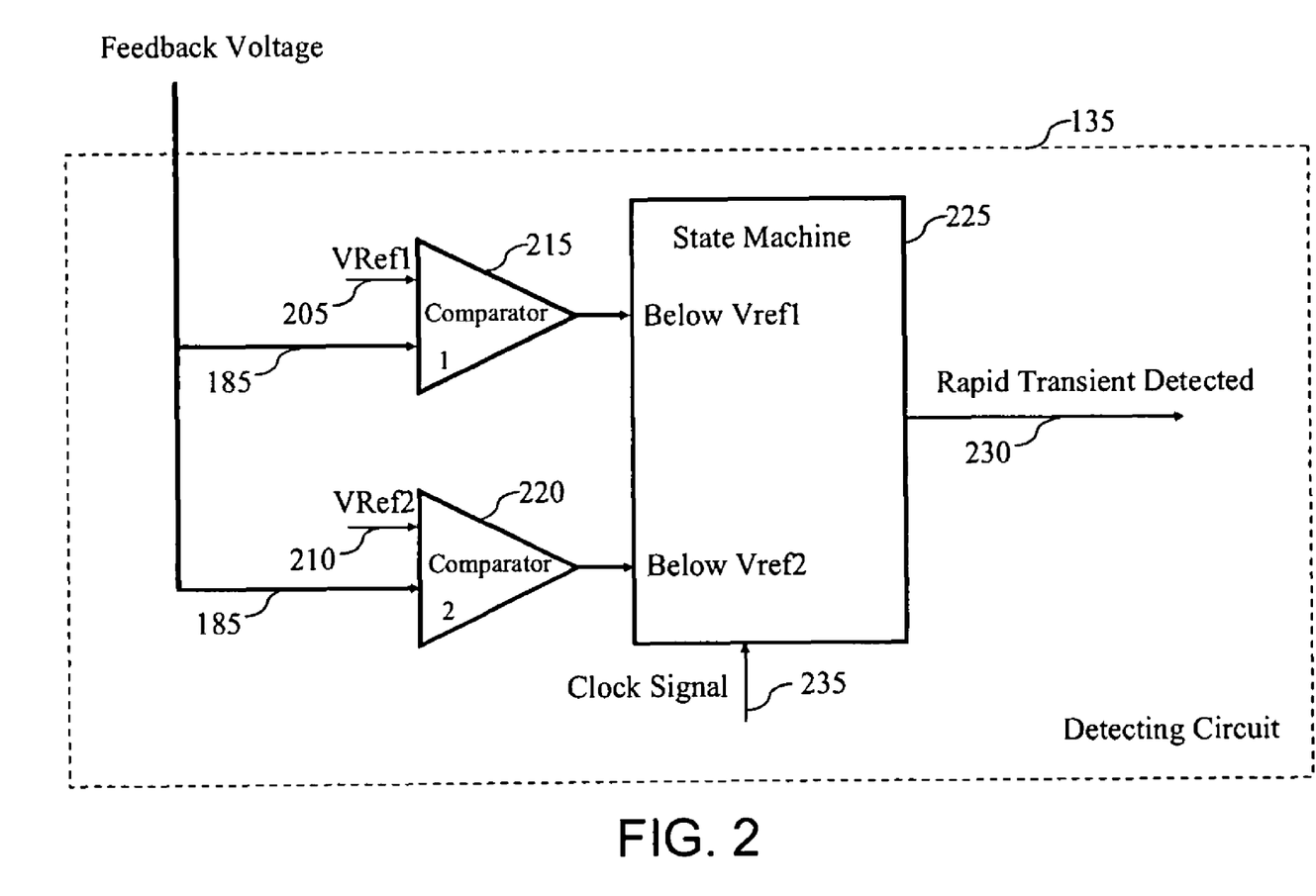
FIG. 2 illustrates an exemplary implementation of a rapid transient detecting circuit according an embodiment of the invention.
Figure 3:
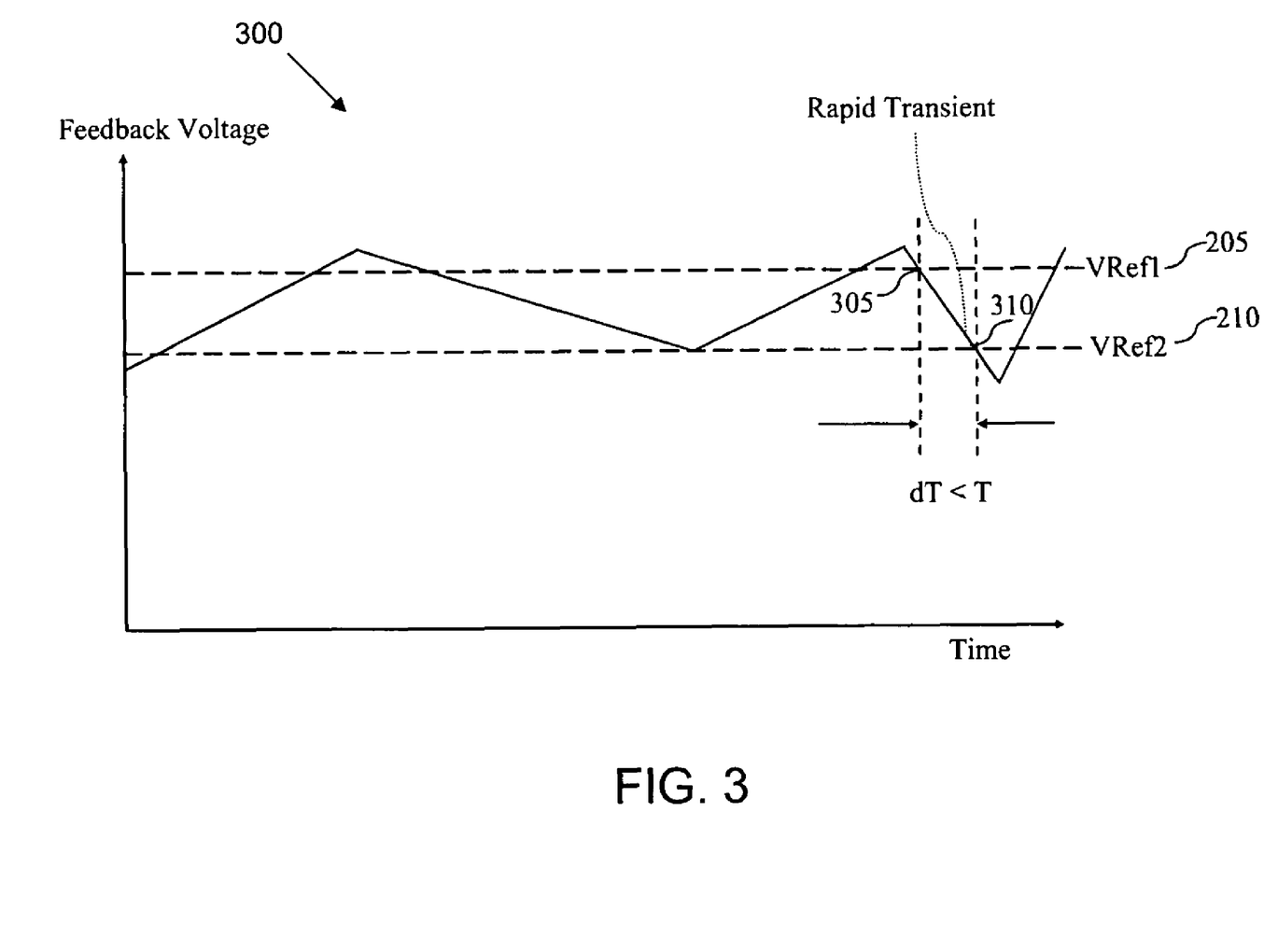
FIG. 3 is a graph illustrating rapid transient in the feedback voltage of a switching device according an embodiment of the invention.
Figure 4:
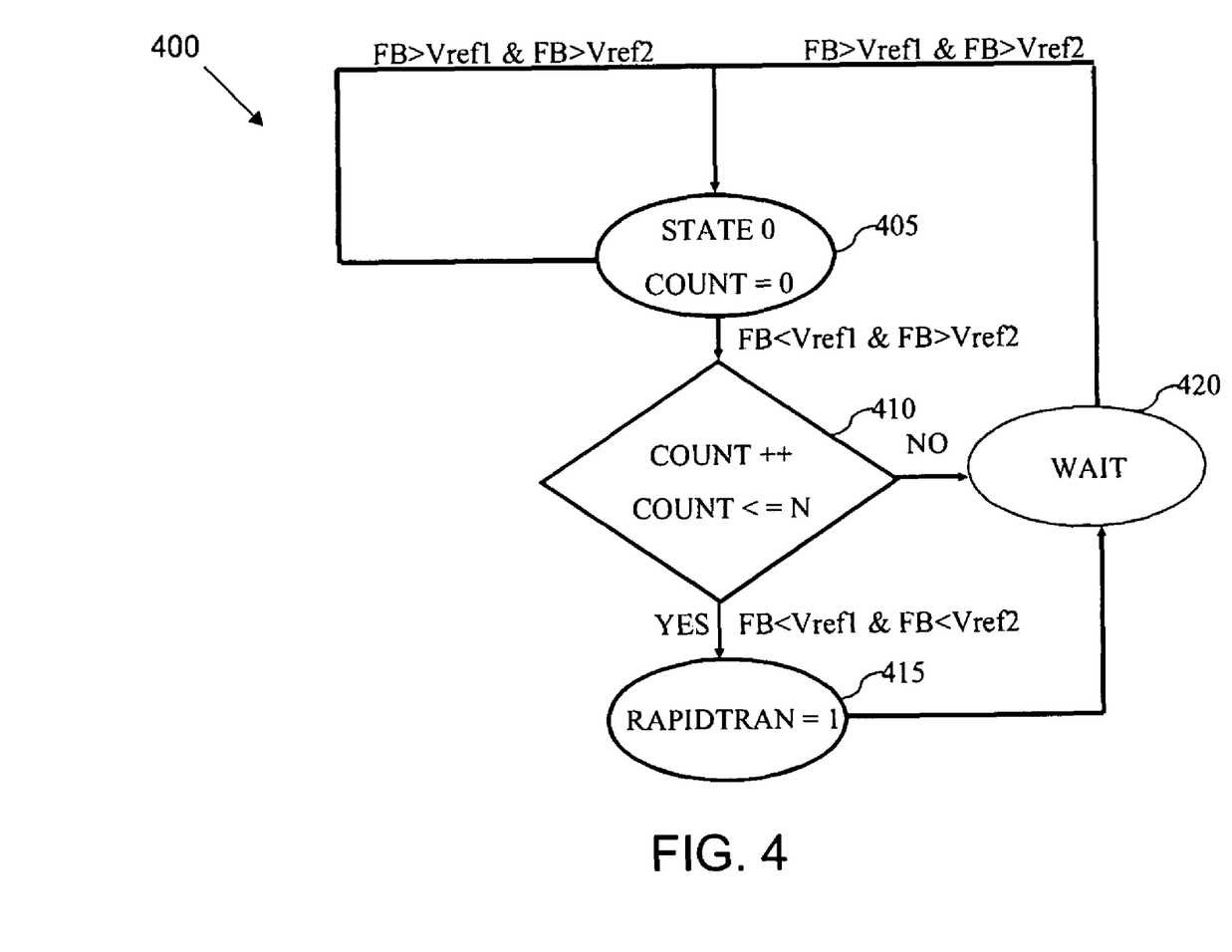
FIG. 4 is a flow diagram illustrating rapid transient detection scheme logic according to an embodiment of the invention.

Operation of the transient recovery circuit 100 according to an embodiment of the invention is explained as follows. The detecting circuit 135 detects a rapid transient in the feedback voltage of the switching stage 105. In an embodiment of the invention, the detecting circuit 135 detects a rapid transient using a slope based detection scheme. A rapid transient is detected when the rate of transition of the output voltage (feedback voltage) exceeds a predetermined threshold rate. The slope based detection scheme is illustrated in FIG. 2, FIG. 3 and FIG. 4. When a rapid transient is detected, the detecting circuit 135 triggers the auxiliary controlling circuit 140. In an embodiment of the invention, the auxiliary controlling circuit 140 is in the feedback loop of the switching device. This configuration provides an in-loop transient recovery mechanism.

Figure 6:
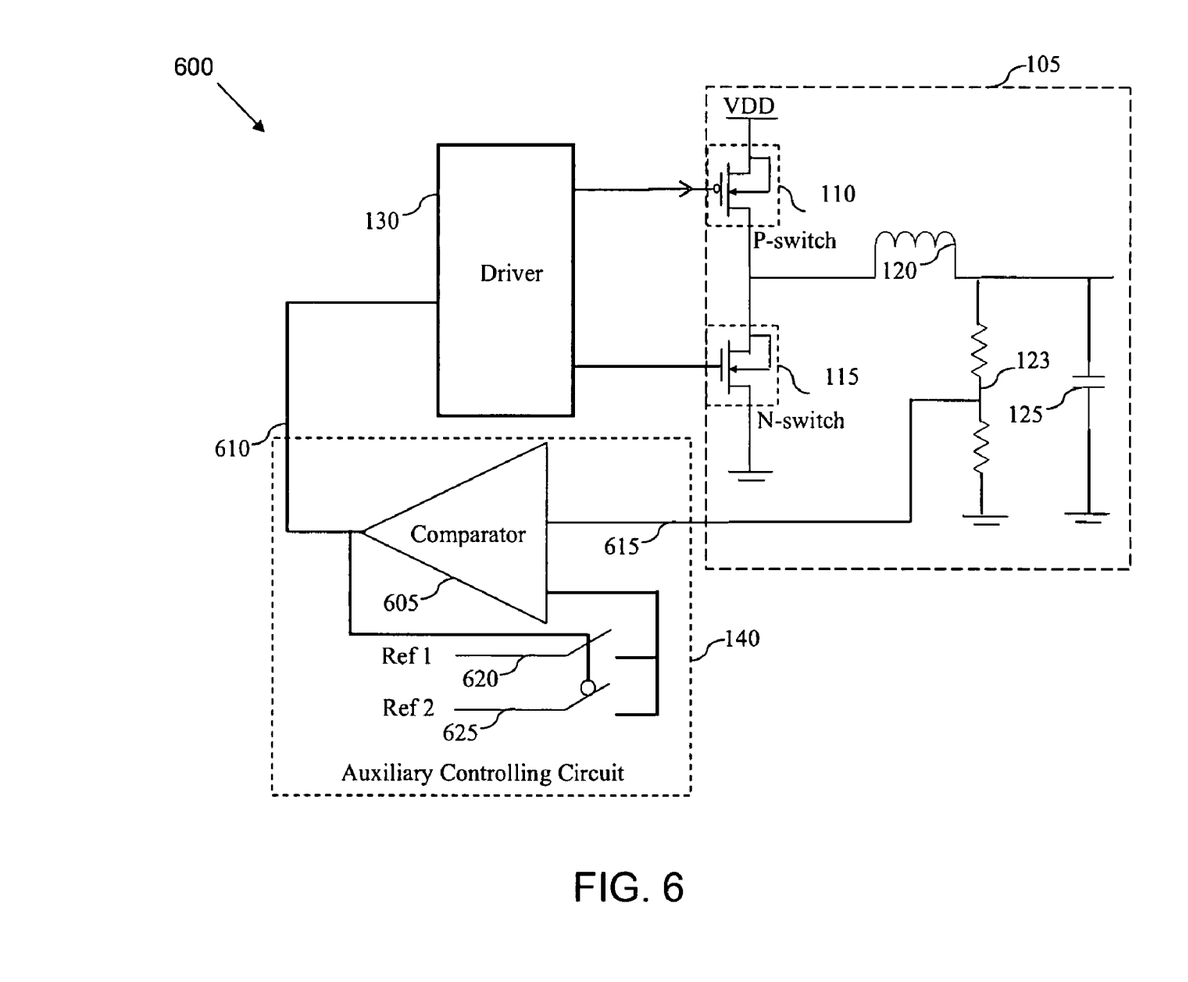
FIG. 6 illustrates an exemplary implementation of an auxiliary controlling circuit of the transient recovery circuit according to an embodiment of the invention.

The auxiliary controlling circuit 140 corrects the output voltage by changing a bandwidth (changing an order of the loop) of the feedback loop and the switching regulator is configured to operate in a pulse width modulation (PWM) mode. Alternatively, in an embodiment of the invention pulse frequency mode (PFM) can also be used. The auxiliary controlling circuit 140 includes a comparator (shown as 605 in FIG. 6, and discussed below) with two reference voltages to control the switching transistors 110, 115 of the switching stage 105 to charge the output capacitor 125 to a required value. Operation of the auxiliary controlling circuit 140 is illustrated in FIG. 6. After the output voltage is corrected, the initializing circuit 145 initializes the feedback loop to the expected operating points in a continuous conduction mode (CCM). In CCM, current continuously flows through the inductor 120 between activation of the switching transistors 110, 115 of the switching regulator. In CCM, the duty cycle is the ratio of input voltage and output voltage. The initializing circuit 145 calculates this expected duty cycle based on input voltage, output voltage and a ramp signal amplitude and charges the output capacitor 155 of the error amplifier 160 such that resulting duty cycle at the output of the auxiliary controlling circuit 140 is equal to the expected duty cycle in CCM. The timeout circuit 190 approximates the time period required to charge the output capacitor 155 of the error amplifier 160 and returns control to the feedback loop of the switching regulator after that time period. After returning control, the regular feedback loop regulates with its loop dynamics.

After the output voltage is corrected, any minor errors that occurred during initializing are corrected using the feedback loop. To achieve faster settling times, a loop controlling circuit 188 is provided. The loop controlling circuit 188 includes a comparator 165 to detect a rise in the output voltage of the switching regulator above a predetermined threshold voltage (provided as a reference voltage to the comparator 165) immediately after the output voltage is corrected. In an embodiment of the invention, the predetermined threshold voltage includes a 1% rise in voltage above the rated output voltage. If a rise is detected, the loop controlling circuit 188 supplies a predetermined amount of charging current to the output capacitor 155 of the error amplifier 160 through an AND gate 170. This causes the pulse width modulation (PWM) loop to settle faster and thereby reducing the settling time.

In an embodiment of the invention, if the output voltage rises after initializing, due to rapid transient and errors while initializing (because of the higher duty cycle forced to the switching regulator than required to support that particular load), the output capacitor 125 of the switching regulator and output capacitor 155 of the error amplifier 160 are discharged and charged by a minimum voltage. This charging and discharging cycle continues till the duty cycle is corrected to a desired value.

FIG. 2 illustrates an exemplary implementation of a rapid transient detecting circuit 135 according an embodiment of the invention. The detecting circuit 135 includes a first comparator 215 and a second comparator 220 connected to a state machine 225. A first reference voltage (Vref1 in FIG. 2) is supplied to the first comparator 215 through a line 205 as a first input. Similarly, a second reference voltage (Vref2 in FIG. 2) is supplied to the second comparator 220 through a line 210 as a first input. Feedback voltage from the switching device is supplied as second inputs to both the comparators 215, 220 through a line 185. The outputs of both the comparators 215, 220 are supplied to the state machine 225. The state machine 225 also receives a clock signal through a line 235.

The comparators 215 and 220 compare the feedback voltage with the reference voltages Vref1 and Vref2 and provide this information to the state machine 225. The state machine 225 detects a rapid transient through a line 230 if the feedback voltage rate exceeds Vref1 and Vref2 within a predetermined threshold rate. For example, if dVout/dT (rate of feedback voltage) is greater than Vout/T (predetermined threshold rate), a rapid transient is detected, wherein Vout is the feedback voltage and T is the time period. Timing information is received from a clock running at a known speed through the clock signal input line 235 to the state machine 225.

It will be appreciated that the particular exemplary embodiment of rapid transient detecting circuit 135 illustrated in FIG. 2 is provided by way of illustration, and not limitation. Those knowledgeable in the art will recognize that other circuit configurations may be used for slope detection. Examples of such slope detection schemes may include slope detection based on response of a filter and digital slope detection with an 'N bit' Analog to Digital Converter (ADC) and a clock of a known time period.

FIG. 3 is a graph 300 illustrating rapid transient in the feedback voltage of a switching device according an embodiment of the invention. The graph 300 illustrates the rate of change of feedback voltage (feedback voltage Vs time). The graph 300 includes two reference voltages marked in FIG. 3 as Vref1, 205 and Vref2, 210. As illustrated, at point 305 the feedback voltage drops below Vref1 and at point 310 the feedback voltage drops below Vref2. If the time taken for the feedback voltage to drop below Vref1 and Vref2 'dt', is less than a predetermined time period 'T' (dt<T), a rapid transient in the feedback voltage is detected.

FIG. 4 is a flow diagram 400 illustrating rapid transient detection scheme logic of the state machine 225 according to an embodiment of the invention. If the feedback voltage is higher that Vref1 (205) and Vref2 (210), the state machine 225 is set to 0 and a count is set to 0 at step 405. The count denotes the clock count. The count is incremented as soon as the feedback voltage exceeds Vref2 at step 410. Further, a check is performed to detect whether the count has reached a predetermined threshold count (COUNT<=N). If the count has reached the predetermined threshold count, and also if the feedback voltage drops below Vref2 within the predetermined threshold count, a rapid transient is detected at step 415. After the rapid transient is detected the state machine 225 waits till the feedback voltage exceeds Vref1 and Vref2 at step 420 and repeats the above cycle. Further, if the count has not reached the predetermined threshold count after incrementing the count, the sate machine waits till the feedback voltage exceeds Vref1 and Vref2.

Figure 5:
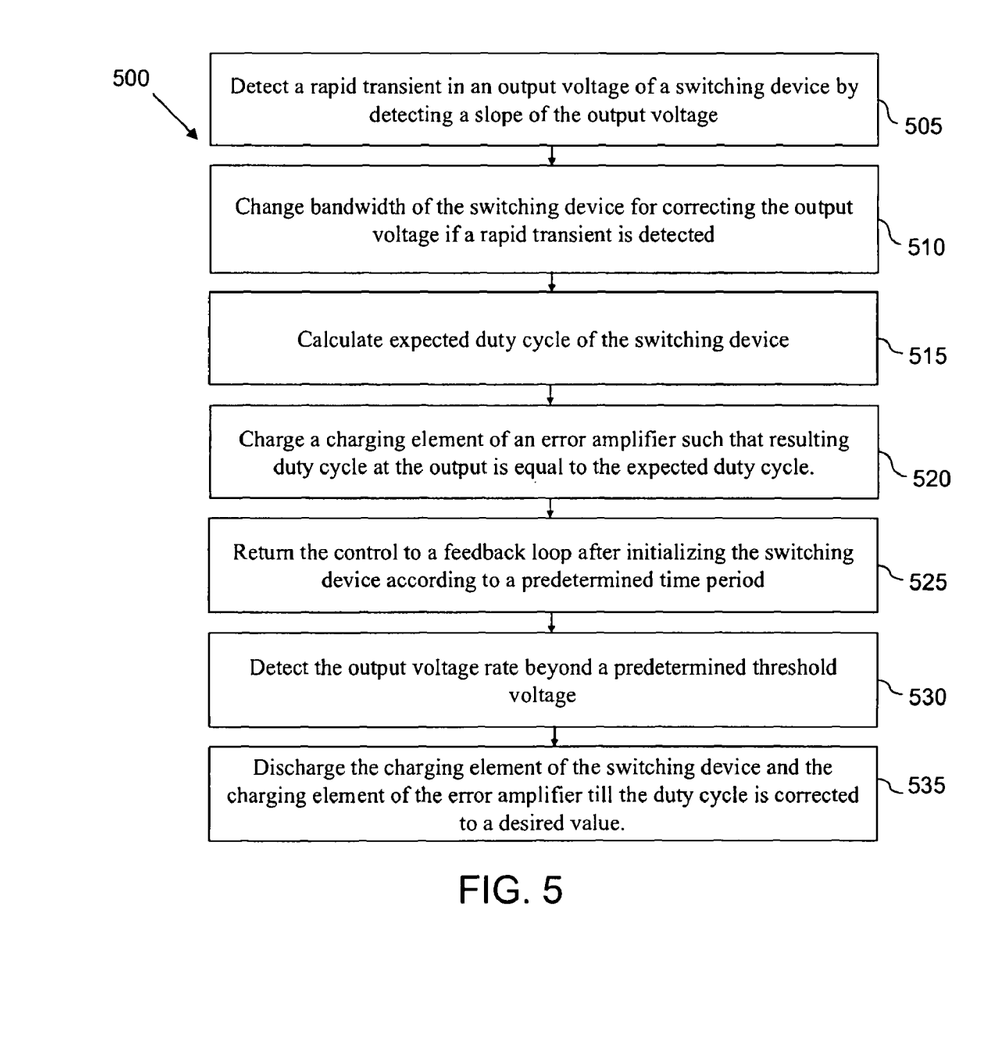
FIG. 5 is a flow diagram illustrating a method for responding to rapid transients in a switching device according to an embodiment of the invention.

FIG. 5 is a flow diagram 500 illustrating a method for responding to rapid transients in a switching device according to an embodiment of the invention. At step 505, a rapid transient is detected in an output voltage of a switching device. An embodiment of the invention detects a rapid transient by detecting a slope of the output voltage. The slope based detection scheme is illustrated in FIG. 2, FIG. 3 and FIG. 4 and has already been discussed. If a rapid transient is detected, bandwidth (order of the feedback loop) of the feedback loop of the switching device is changed at step 510, for correcting the output voltage. The switching device is initialized to expected operating points in CCM after correcting the output voltage. The switching device is initialized at steps 515 and 520. At step 515, an expected duty cycle of the switching device is calculated based on input voltage, output voltage and ramp signal amplitude of the switching device. In an embodiment of the invention, steps 515 and 520 may be performed simultaneously. Further at step 520, a charging element of an error amplifier such as 160 is charged such that the resulting duty cycle at the output is equal to the expected duty cycle.

At step 525, control of the switching device is returned to the feedback loop after initializing the feedback loop. In an embodiment of the invention, the control is returned to the feedback loop based on a predetermined time period required to charge the output capacitor 155 of the error amplifier 160. In another embodiment of the invention, the control is returned to the feedback loop by detecting the settling of the output voltage in a required zone. After returning the control, at step 530, the output voltage exceeding a predetermined threshold voltage is detected. If the output voltage exceeds the predetermined threshold voltage, the charging element of the switching device and the charging element of the error amplifier 160 are discharged till the duty cycle is corrected to a desired value at step 535. In an embodiment of the invention, if the output voltage exceeding a predetermined threshold voltage is not detected within a predetermined time period, steps 530 and 535 may not be performed.

It will be appreciated that the method embodiment of the invention as illustrated in FIG. 5 is not limited to a switching device, and it can be further extended to any integrated circuit (active device) where a rapid transient needs to be detected.

FIG. 6 illustrates an exemplary implementation of the auxiliary controlling circuit 140 of the transient recovery circuit 100 according to an embodiment of the invention. The auxiliary controlling circuit 140 is triggered by the detecting circuit 135 if a rapid transient is detected. The auxiliary controlling circuit 140 includes a comparator 605 having the feedback voltage of the switching stage 105 of the switching regulator as one input through a line 615 and two reference voltages (ref1, ref2) through lines 620 and 625 as other inputs. The two reference voltages include a higher threshold voltage and a lower threshold voltage which are predetermined. The output of the comparator 605 is connected to the driver 130 of the switching regulator through a line 610. The comparator 605 drives the switching transistors 110, 115 of the switching regulator which controls the charging of the output capacitor 125 of the switching regulator.

The auxiliary controlling circuit 140 turns the switching transistor 110 (P-switch) ON and charges the output capacitor 125 till the output voltage (feedback voltage) exceeds a higher threshold voltage (ref1 in FIG. 6). The switching transistor 110 is turned OFF when the output voltage exceeds a higher threshold voltage (ref1). The load discharges the output capacitor 125 till the output voltage drops to a lower threshold voltage (ref2 in FIG. 6). After the output voltage drops to the lower threshold voltage, the switching transistor 110 is turned ON and the error amplifier output capacitor 155 is again charged back to the higher threshold voltage. This cycle continues till the output voltage is corrected.

It will be appreciated that the particular exemplary embodiment of auxiliary controlling circuit 140 illustrated in FIG. 6 is provided by way of illustration, and not limitation. Those knowledgeable in the art will recognize that other schemes and circuit configurations may be used instead of the auxiliary controlling circuit 140. An example of one such scheme is changing the order of the system to a first order loop where the error amplifier 160 and the error amplifier output capacitor 155 are not present in the first order loop.

Figure 7:
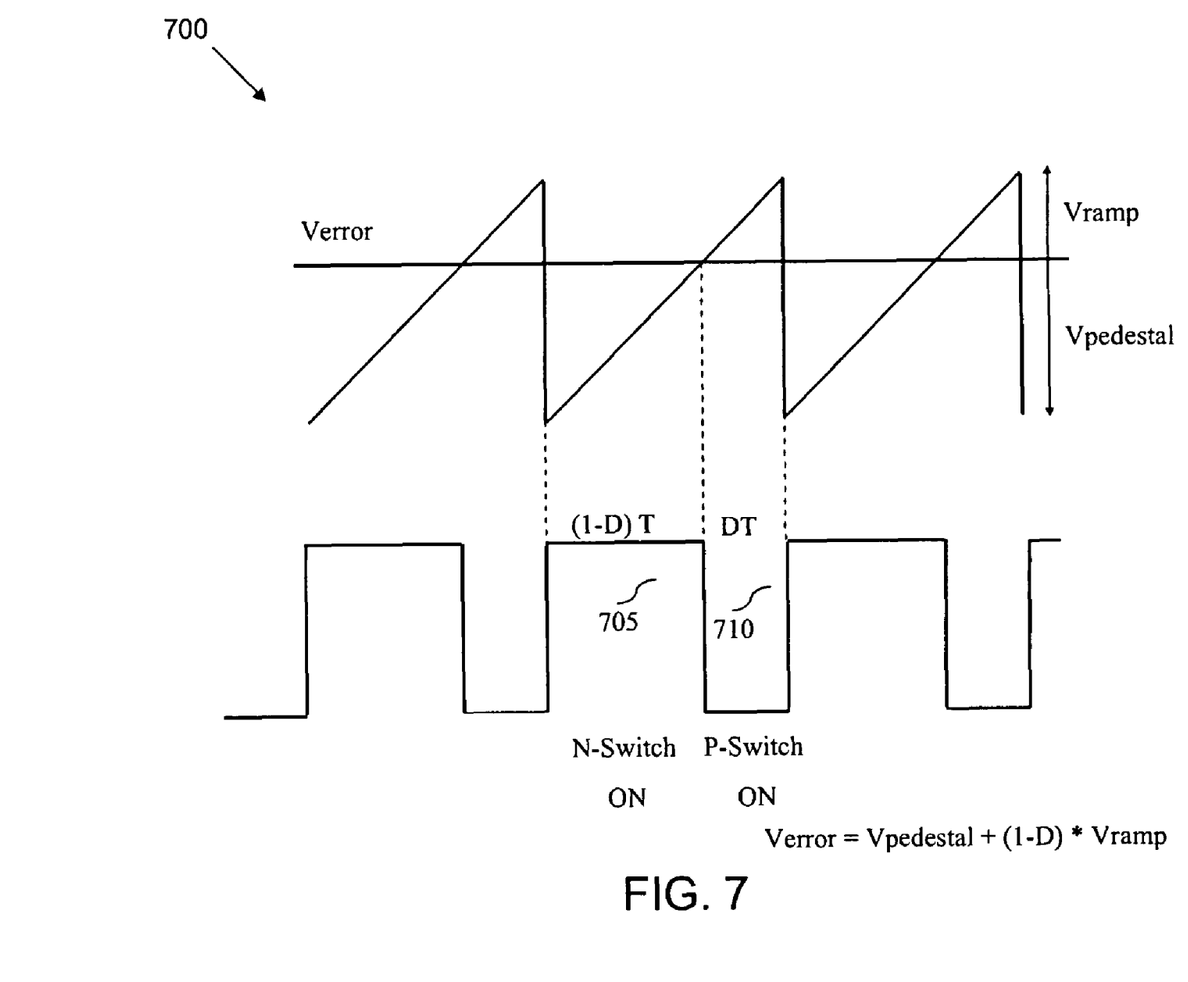
FIG. 7 illustrates an initialization scheme according to an embodiment of the invention.

FIG. 7 illustrates an initialization scheme 700 according to an embodiment of the invention.

In any system, the order of the system is related to number of state variables or storage elements in the system. For a system to be initialized correctly, all these state variables are to be initialized to the required values. This is true even for buck converters having digital control loop. In the given system (transient recovery circuit 100) according to an embodiment of the invention, output capacitor voltage and inductor current are controlled by the auxiliary controlling circuit 140 during rapid transient. The only other state variable is the error amplifier output capacitor 155 (at the output of the error amplifier 160). This error amplifier output capacitor 155 is initialized by the initialization circuit 145 using the equations. For any other implementation of the loop, the state variables can be initialized based on the steady state equations of the variables.

As explained earlier, the initializing circuit 145 calculates the expected duty cycle based on input voltage, output voltage and a ramp signal amplitude and charges the output capacitor 155 of the error amplifier 160 such that resulting duty cycle at the output of the auxiliary controlling circuit 140 is equal to the expected duty cycle in CCM. The estimation of initializing value is explained in FIG. 7. When the switching device is regulating in CCM, the arrangement of inputs of the comparator 150 is depicted in FIG. 7. The error amplifier 160 generates error voltage 'Verror', which is compared with a ramp signal having a pedestal voltage 'Vpedestal' and amplitude 'Vramp'. The comparator 150 output is a rectangular wave of duty cycle 'D'. As shown in FIG. 7, for the time period 'DT' (710), P-switch 110 is turned ON, while for the time period '(1−D) T' (705), N-switch 110 is turned ON. For a buck type switching device in CCM, the value of 'D' is approximately equal to 'Vout/Vin', wherein 'Vout' is the output voltage and 'Vin' is the input voltage. Using this information, and from FIG. 7, the value of Verror can be estimated to be:

$$Verror = Vpedestal + (1-D) * Vramp;$$

$$Verror = Vpedestal + (1-(Vout/Vin)) * Vramp;$$

Where 'Verror' is the output of the error amplifier 160, 'Vpedestal' is the pedestal voltage of the ramp signal, 'Vramp' is the amplitude of the ramp signal and 'D' is the duty cycle.

As all the terms on the right hand side of the equation is known in a switching device, a simple circuit can be designed to implement this equation and thus find an approximate value of 'Verror'. An exemplary implementation of such an initializing circuit is given in FIG. 8. This initialization of 'Verror' provides the feedback loop an initial condition, from which it can settle to final operating point quickly. It will be appreciated that the initializing scheme according to this embodiment of the invention is not limited to buck type switching device, and can be used for any type of switching device, for example, boost and buck-boost, and for any ramp architecture, for example a negative ramp.

Figure 8:
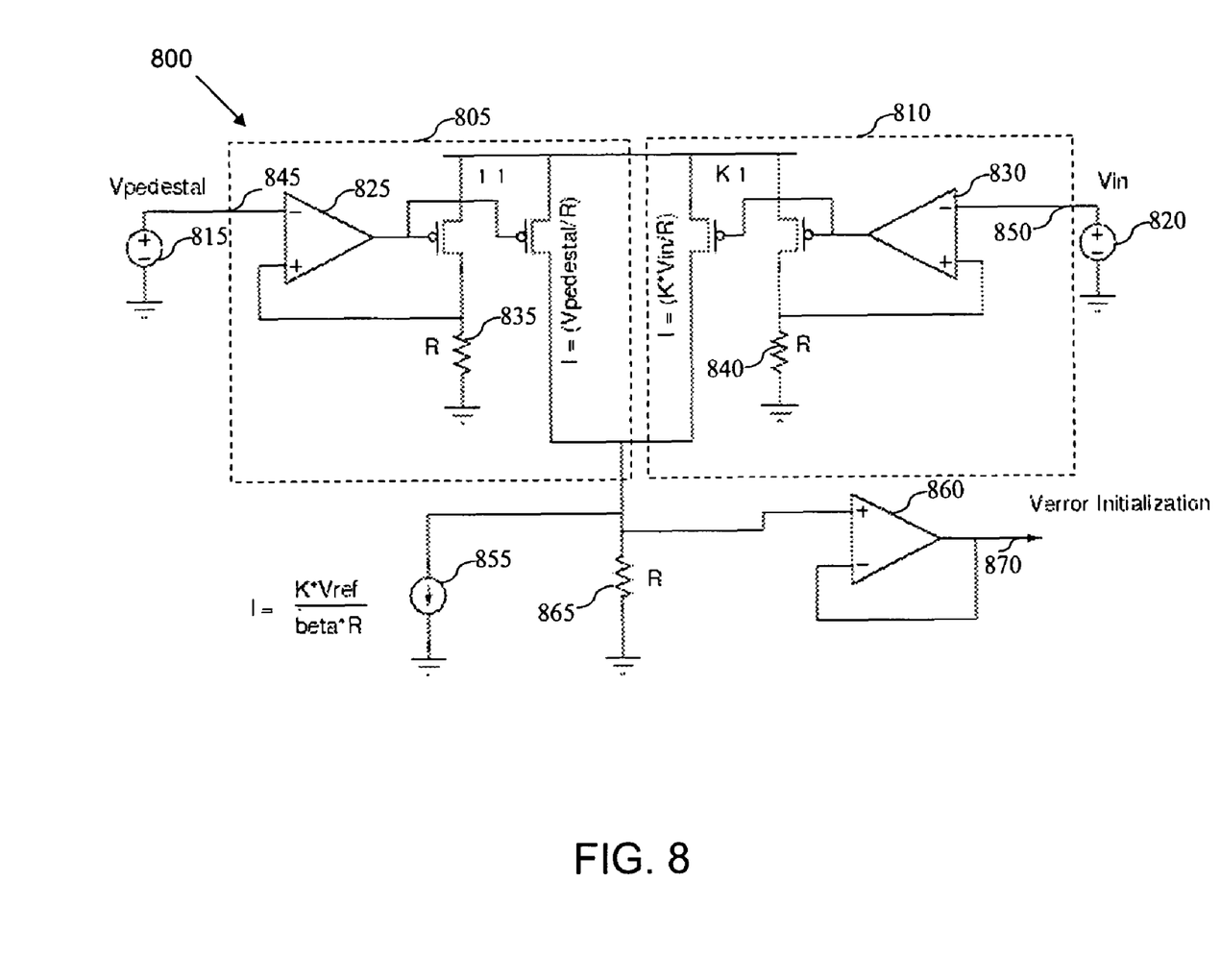
FIG. 8 illustrates an exemplary implementation of an initializing circuit of the transient recovery circuit according to an embodiment of the invention.

FIG. 8 illustrates an exemplary implementation of an initializing circuit 145 to estimate the initializing value according to an embodiment of the invention 800. The initializing circuit 145 includes a first voltage to current converter circuit 805 and a second voltage to current converter circuit 810 connected to each other. Both the voltage to current converter circuits 805, 810 includes an amplifier (825 or 830) where an inverting terminal of the amplifier 825 or 830 receives the input voltage and converts the input voltage into a current. Outputs of the amplifiers 825, 830 are connected to a set of transistors and also to the a non-inverting terminal of the amplifiers 825, 830 as feedback voltages.

If 'Vramp' is made proportional to Win', then 'Verror' becomes, $$Verror = Vpedestal + K*(Vin-Vout);$$

$$Verror = Vpedestal + K*Vin - K*Vref/beta;$$

Where 'Verror' is the output of the error amplifier 160, 'Vpedestal' is the pedestal voltage 815, 'K' is the proportionality constant between 'Vramp' and 'Vin', 'Vin' 820 is the input voltage, and 'Vref/beta' is another constant.

In the initializing circuit 145, the pedestal voltage 'Vpedestal', 815 is supplied to the first voltage to current converter circuit 805 on a line 845. The first voltage to current converter circuit converts 'Vpedestal' to a current which is equal to I=Vpedestal/R, where a' is the resistance of a resistor 835. Similarly, input voltage 'Vin', 820 is supplied to the second voltage to current converter circuit 810 on a line 850. The second voltage to current converting circuit 810 converts 'Vin' to a current which is equal to I=K*Vin/R, where a' is the resistance of a resistor 840 and 'K' is a constant. The DC current is removed from both these currents by supplying another reference current 855 which is equal to K*Vref/beta*R. When these currents pass through a resistor 865, the output will be initialization value of 'Verror', and is passed through a unity gain amplifier 860. Output of the unity gain amplifier 860 is the Verror initialization value on a line 870. An equation representing the aforementioned description according to an embodiment of the invention is given below.

$$Verror = [(Vpedestal/R) + (K*Vin/R) - (K*Vref/beta*R)]/R;$$

$$Verror = Vpedestal + K*Vin - K*Vref/beta.$$

Embodiments of the invention are explained considering a buck type switching regulator as an example. However, embodiments of the invention can also be extended to non-buck type regulators and other switching devices.

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal. Where either a field effect transistor (FET) or a bipolar junction transistor (BJT) may be employed as an embodiment of a transistor, the scope of the terms "gate", "drain", and "source" include "base", "collector", and "emitter", respectively, and vice versa.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A transient recovery circuit comprising:
   a detecting circuit for detecting a rapid transient in an output voltage of a switching device by detecting a rate of the transient in the output voltage;
   an auxiliary controlling circuit, in a feedback loop of the switching device, for correcting the output voltage by changing a bandwidth of the feedback loop if the rapid transient is detected; and
   an initializing circuit for initializing the feedback loop to expected operating points in a continuous conduction mode after correcting the output voltage wherein the initializing circuit calculates an expected duty cycle based on input voltage, the output voltage and a ramp signal amplitude and charges an output capacitor of an error amplifier such that a resulting duty cycle at output of the auxiliary controlling circuit is equal to the expected duty cycle.

2. The transient recovery circuit of claim 1, further comprising:
   a timeout circuit for returning the control to a feedback loop of the switching device from the auxiliary controlling circuit according to a predetermined time period.

3. The transient recovery circuit of claim 1, wherein the detecting circuit detects the rapid transient in the output voltage if the rate of the transient in the output voltage exceeds a predetermined threshold value of the rate of the transient in the output voltage.

4. The transient recovery circuit of claim 1, wherein the auxiliary controlling circuit comprises a comparator driving a switch transistor of the switching device for correcting the output voltage.

5. The transient recovery circuit of claim 1, further comprising:
   a loop controlling circuit for supplying a charge to the output capacitor of the error amplifier until the resulting duty cycle is corrected to a desired value of the output voltage which exceeds a predetermined threshold value of the output voltage after correcting the output voltage, thereby reducing settling time of the feedback loop.

6. The transient recovery circuit of claim 1, wherein a rapid transient comprises a low load transient to a high load transient.

7. The transient recovery circuit of claim 1, wherein a rapid transient comprises a high load transient to a low load transient.

8. The transient recovery circuit of claim 1, whereby the transient recovery circuit actively corrects transient errors occurring at the output voltage of the switching device.

9. A method for responding to a rapid transient in a switching device comprising:
   detecting a rapid transient in an output voltage of a switching device by detecting a slope of the output voltage;
   changing a bandwidth of a feedback loop of the switching device for correcting the output voltage if a rapid transient is detected; and
   initializing the feedback loop to expected operating points in a continuous conduction mode after correcting the output voltage, wherein initializing the feedback loop comprises:
      calculating an expected duty cycle based on input voltage, the output voltage and ramp signal amplitude of the switching device; and
      charging a charging element of an error amplifier such that a resulting duty cycle at output is equal to the expected duty cycle.

10. The method of claim 9 further comprising:
    returning the control to a feedback loop of the switching device after initializing the feedback loop according to a predetermined time period.

11. The method of claim 9, wherein correcting the output voltage comprises:
    driving a switching element of the switching device to control current in a charging element of the switching device.

12. The method of claim 9 further comprising:
    detecting the rapid transient in the output voltage beyond a predetermined threshold value of the transient in the output voltage after correcting the output voltage; and
    discharging the charging element of the switching device and the charging element of the error amplifier until the resulting duty cycle is corrected to a desired value.

13. The method of claim 9, wherein detecting the rapid transient comprises:
    detecting the rapid transient if the slope of the output voltage exceeds a predetermined threshold value of the slope of the output voltage.

14. The method of claim 9, further comprising:
    supplying a charge to the charging element of the error amplifier until the resulting duty cycle is corrected to a desired value of the output voltage which exceeds a predetermined threshold value of the output voltage after correcting the output voltage, thereby reducing settling time of the feedback loop.

15. The method of claim 9, further comprising:
    actively correcting transient errors occurring at the output voltage of the switching device.

* * * * *